(12) United States Patent
 Nishimoto et al.

(10) Patent No.: US 12,246,290 B2
(45) Date of Patent: Mar. 11, 2025

(54) MEMBRANE FILTRATION DEVICE AND METHOD FOR CLEANING MEMBRANE FILTRATION DEVICE

(71) Applicant: KUBOTA CORPORATION, Osaka (JP)

(72) Inventors: Shintaro Nishimoto, Amagasaki (JP); Keishi Watanabe, Amagasaki (JP); Tetsuya Uenaka, Amagasaki (JP); Fang Zhao, Amagasaki (JP); Akira Matsunaga, Amagasaki (JP)

(73) Assignee: KUBOTA CORPORATION, Osaka (JP)

( * ) Notice: Subject to any disclaimer, the term of this patent is extended or adjusted under 35 U.S.C. 154(b) by 303 days.

(21) Appl. No.: 17/417,623

(22) PCT Filed: Dec. 12, 2019

(86) PCT No.: PCT/JP2019/048609
§ 371 (c)(1),
(2) Date: Jun. 23, 2021

(87) PCT Pub. No.: WO2020/137564
PCT Pub. Date: Jul. 2, 2020

(65) Prior Publication Data
US 2022/0111336 A1    Apr. 14, 2022

(30) Foreign Application Priority Data
Dec. 27, 2018   (JP) .................................. 2018-243845

(51) Int. Cl.
*B01D 65/02*     (2006.01)
*B01D 63/00*     (2006.01)
*C02F 1/44*      (2023.01)

(52) U.S. Cl.
CPC ............. *B01D 65/02* (2013.01); *B01D 63/00* (2013.01); *C02F 1/44* (2013.01); *B01D 2317/04* (2013.01);
(Continued)

(58) Field of Classification Search
CPC .... B01D 65/02; B01D 63/00; B01D 2317/04; B01D 2321/04; B01D 2321/12;
(Continued)

(56) References Cited

U.S. PATENT DOCUMENTS

2018/0021734 A1*   1/2018   Eder ..................... C02F 1/444
                                                              210/636

FOREIGN PATENT DOCUMENTS

CN          1548219 A       11/2004
CN          201959729 U     9/2011
(Continued)

OTHER PUBLICATIONS

Matsutani, JP2002346348 A, English machine translation (Year: 2002).*
(Continued)

*Primary Examiner* — Claire A Norris
(74) *Attorney, Agent, or Firm* — Renner, Otto, Boisselle & Sklar, LLP

(57) ABSTRACT

A membrane filtration device includes a plurality of membrane separation units vertically disposed in multiple stages. The membrane separation unit has a primary side communicating with a backwash drainage system and a flushing-air supply system to receive supplied raw water and a secondary side communicating with a backwash-water supply system to collect permeate. The backwash-water supply system includes a backwash-water main pipe and a plurality of backwash-water branch pipes to feed the backwash water into the membrane separation units. The backwash drainage
(Continued)

system includes a plurality of backwash-drainage branch pipes and a backwash-drainage main pipe connected in parallel to the backwash-drainage branch pipes. The flushing-air supply system includes an air main pipe for passing flushing air upward and a plurality of air branch pipes for feeding flushing air into the membrane separation units, the air branch pipes being connected in parallel to the air main pipe.

3 Claims, 5 Drawing Sheets

(52) U.S. Cl.
CPC ...... *B01D 2321/04* (2013.01); *B01D 2321/12* (2013.01); *B01D 2321/18* (2013.01); *C02F 2303/16* (2013.01)

(58) Field of Classification Search
CPC .......... B01D 2321/18; B01D 2321/185; B01D 2321/2083; C02F 1/44; C02F 2303/16
USPC ........................................................ 210/636
See application file for complete search history.

(56) References Cited

FOREIGN PATENT DOCUMENTS

| | | | |
|---|---|---|---|
| EP | 3012012 A1 | 4/2016 | |
| JP | 2001-219038 A | 8/2001 | |
| JP | 2002-346348 A | 12/2002 | |
| JP | 2007-245121 A | 9/2007 | |
| JP | 2008207143 A | * | 9/2008 |
| JP | 2011-212586 A | 10/2011 | |
| JP | 6362748 B1 | 7/2018 | |
| KR | 20120048621 A | * | 5/2012 |
| WO | WO2008/101816 A2 | 8/2008 | |
| WO | WO2010/084961 A1 | 7/2010 | |
| WO | WO2015/164505 A1 | 10/2015 | |
| WO | WO2018/053304 A1 | 3/2018 | |

OTHER PUBLICATIONS

Kamimura, JP2001219038 A, English machine translation (Year: 2001).*

Hashimoto, KR20120048621 A, English machine translation (Year: 2012).*

Oyachi, JP 200807143 A, Machine translation, pp. 1-6 (Year: 2008).*

Office Action (with English-language translation) issued Nov. 17, 2022 in corresponding Chinese Patent Application No. 201980086228.8.

Extended European Search Report dated Jul. 13, 2022 from corresponding European Patent Application No. 19904518.8.

International Search Report from corresponding International Patent Application No. PCT/JP19/48609, dated Feb. 10, 2020.

* cited by examiner

MEMBRANE FILTRATION DEVICE AND METHOD FOR CLEANING MEMBRANE FILTRATION DEVICE

FIELD OF THE INVENTION

The present invention relates to a membrane filtration device and a technique of backwashing a filtration membrane.

BACKGROUND OF THE INVENTION

A conventional membrane filtration device for water purification is described in, for example, Japanese Patent No. 6362748. Such a filtration device is configured as illustrated in FIG. 5. FIG. 5 illustrates a membrane separation system including a plurality of membrane modules 1 connected in parallel to perform a membrane filtration operation. The membrane separation system includes a treated-liquid supply branch pipe 2 for supplying a liquid to be treated into the treated-liquid supply ports of the membrane modules 1, a permeate branch pipe 3 for passing permeate collected from the permeate outlet ports of the membrane modules 1, and a flushing-fluid supply branch pipe 4 for supplying a flushing-fluid into the flushing-fluid supply ports of the membrane modules 1.

A backwash fluid supply unit 5 is connected to the permeate branch pipe 3. The inside of the permeate branch pipe 3 is pressurized to pass a backwash fluid from the secondary sides to the primary sides of the membrane modules 1, thereby performing counter pressure cleaning.

A flushing-fluid supply unit 6 is connected to one end of a flushing-fluid supply branch pipe 4 to which the membrane modules 1 are connected in parallel. The flushing-fluid supply unit 6 supplies flushing-fluid into the flushing-fluid supply branch pipe 4.

A cleaning wastewater drain 7 is connected to one end of the treated-liquid supply branch pipe 2 to which the membrane modules 1 are connected in parallel. The cleaning wastewater drain 7 allows drainage of cleaning wastewater delivered from the treated-liquid supply ports during the cleaning of the membrane modules 1.

The cleaning wastewater is a gas-liquid mixed fluid of a flushing fluid and a backwash fluid. The flushing fluid is a flushing compressed air while the backwash fluid is backwash water.

In this configuration, in a membrane filtration step, a liquid to be treated flows into the primary sides of the membrane modules 1 from the treated-liquid supply branch pipe 2 disposed below the membrane modules 1, passes through the membrane modules 1, and fills the flushing-fluid supply branch pipe 4 disposed above the membrane modules 1.

Thus, in the step of flushing, a liquid to be treated that fills the flushing-fluid supply branch pipe 4 is pressed out and is fed downward into the membrane modules 1 by compressed air for flushing, the compressed air for flushing is supplied into the membrane modules 1, and cleaning wastewater is drained from the membrane modules 1 into the treated-liquid supply branch pipe 2.

In this configuration, the membrane modules 1 are disposed at the same height and are connected in parallel. Thus, the compressed air for flushing is substantially simultaneously delivered into the membrane modules 1 connected in parallel, so that a proper amount of compressed air for flushing can be supplied to the membrane modules.

Unfortunately, if membrane modules of different heights are vertically placed in multiple stages and the membrane modules placed in the longitudinal direction are cleaned at the same time, compressed air for flushing may be delivered without substantially simultaneously passing through the membrane modules of different heights.

If flushing-fluid supply branch pipes are connected in parallel in stages, the branch pipes require a parallel connection via a longitudinally extending pipe. Also in the case of treated-liquid supply branch pipes connected in parallel in stages, a parallel connection via a longitudinally extending pipe is necessary.

Thus, in the step of flushing, when compressed air for flushing is supplied into the longitudinal pipe from above, a liquid left to be treated in the longitudinal pipe acts as a resistance so as to interfere with the flow of the compressed air for flushing into the flushing-fluid supply branch pipes of the stages.

Hence, the compressed air for flushing preferentially flows into the membrane modules of the upper stage from the longitudinal pipe and is consumed therein, leading to a delay in flowing into the flushing-fluid supply branch pipe of the lower stage. Moreover, cleaning wastewater preferentially flows into the longitudinal pipe from the treated-liquid supply branch pipe of the upper stage, leading to a delay in flowing into the longitudinal pipe from the treated-liquid supply branch pipe of the lower stage. This further delays the flow of compressed air for flushing into the flushing-fluid supply branch pipe of the lower stage.

This state gradually proceeds from the intermediate stage to the lower stage, requiring a long time before passing compressed air for flushing into the flushing-fluid supply branch pipe of the lowermost stage. Thus, the compressed air for flushing is not substantially simultaneously delivered into the membrane modules of different heights. Furthermore, when compressed air for flushing reaches the flushing-fluid supply branch pipe of the lowermost stage, an air pressure decreases in an air container that contains compressed air for flushing, thereby lessening the effect of cleaning the membrane modules connected to the flushing-fluid supply branch pipe of the lowermost stage.

SUMMARY OF THE INVENTION

The present invention has been devised to solve the problem described above. An object of the present invention is to provide a membrane filtration device and a method for cleaning the membrane filtration device, by which compressed air for flushing is substantially simultaneously delivered into a plurality of membrane modules vertically disposed in multiple stages.

In order to solve the problem, a membrane filtration device of the present invention includes a plurality of membrane separation units vertically disposed in multiple stages, wherein each of the membrane separation units has a primary side communicating with a backwash drainage system and a flushing-air supply system so as to receive supplied raw water and a secondary side communicating with a backwash-water supply system so as to collect permeate, the backwash-water supply system includes a backwash-water main pipe for passing backwash water and a plurality of backwash-water branch pipes connected in parallel to the backwash-water main pipe so as to feed the backwash water into the membrane separation units of the stages, the backwash water being supplied downward into the backwash-water main pipe and fed into the membrane separation units of the stages through the backwash-water branch pipes, the backwash drainage system includes a plurality of backwash-drainage branch pipes into which backwash drain water flows from the membrane separation units of the stages and a backwash-drainage main pipe for passing backwash drain water downward, the backwash-drainage main pipe being connected in parallel to the backwash-drainage branch pipes of the stages, and the flushing-air supply system includes an air main pipe for passing flushing air upward and a plurality of air branch pipes for feeding flushing air into the membrane separation units of the stages, the air branch pipes being connected in parallel to the air main pipe, the flushing air flowing upward in raw water of the air main pipe and being fed into the membrane separation units of the stages through the air branch pipes.

In order to solve the problem, a membrane filtration device of the present invention includes a plurality of membrane separation units vertically disposed in multiple stages, wherein each of the membrane separation units has a primary side communicating with a backwash drainage system and a flushing-air supply system so as to receive supplied raw water and a secondary side communicating with a backwash-water supply system so as to collect permeate, the backwash-water supply system includes a backwash-water main pipe for passing backwash water and a plurality of backwash-water branch pipes connected in parallel to the backwash-water main pipe so as to feed the backwash water into the membrane separation units of the stages, the backwash water being supplied upward into the backwash-water main pipe and fed into the membrane separation units of the stages through the backwash-water branch pipes, the backwash drainage system includes a plurality of backwash-drainage branch pipes into which backwash drain water flows from the membrane separation units of the stages and a backwash-drainage main pipe for passing backwash drain water downward, the backwash-drainage main pipe being connected in parallel to the backwash-drainage branch pipes of the stages, and the flushing-air supply system includes an air main pipe for passing flushing air upward and a plurality of air branch pipes for feeding flushing air into the membrane separation units of the stages, the air branch pipes being connected in parallel to the air main pipe, the flushing air flowing upward in raw water of the air main pipe and being fed into the membrane separation units of the stages through the air branch pipes.

In the membrane filtration device of the present invention, the backwash drainage system is configured such that the backwash-drainage main pipe is vertically disposed and the backwash-drainage branch pipes are horizontally disposed, and the flushing-air supply system is configured such that the air main pipe is vertically disposed and the air branch pipes are horizontally disposed.

In the membrane filtration device of the present invention, the membrane separation units are disposed in each of the stages, and the membrane separation units are connected in parallel to the backwash-water branch pipe, the backwash-drainage branch pipe, and the air branch pipe in each of the stages.

In the membrane filtration device of the present invention, the flushing-air supply system includes an air supply unit connected to the lower end of the air main pipe.

In the membrane filtration device of the present invention, the backwash drainage system acts as a raw-water supply system, and the backwash-water supply system acts as a permeate collection system.

A method for cleaning a membrane filtration device according to the present invention is: a method for cleaning a membrane filtration device including a plurality of membrane separation units vertically disposed in multiple stages, wherein each of the membrane separation units has a primary side communicating with a backwash drainage system and a flushing-air supply system so as to receive supplied raw water and a secondary side communicating with a backwash-water supply system so as to collect permeate, the membrane separation unit performing membrane filtration and cleaning, the cleaning including: supplying flushing air into the primary sides of the membrane separation units through the flushing-air supply system while supplying backwash water into the secondary sides of the membrane separation units through the backwash-water supply system; and draining backwash drain water of a gas-liquid mixed fluid from the primary sides of the membrane separation units through the backwash drainage system, the backwash water is supplied downward into a backwash-water main pipe of the backwash-water supply system and is fed into the membrane separation units of the stages through backwash-water branch pipes connected in parallel to the backwash-water main pipe, the flushing air is supplied upward into an air main pipe of the flushing-air supply system filled with raw water supplied in the membrane filtration, the flushing air flows upward in the raw water of the air main pipe into a plurality of air branch pipes connected in parallel to the air main pipe and is fed into the membrane separation units of the stages through the air branch pipes, and the backwash drain water is drained from the membrane separation units of the stages into backwash-drainage branch pipes of the stages and flows downward in a backwash-drainage main pipe connected in parallel to the backwash-drainage branch pipes of the stages.

In the method for cleaning a membrane filtration device according to the present invention, the flushing air contains compressed air stored in an air container of an air supply unit connected to the lower end of the air main pipe, and the compressed air is supplied into the flushing-air supply system by an air pressure in the air container.

In the method for cleaning a membrane filtration device according to the present invention, the membrane filtration process includes: supplying raw water into the primary sides of the membrane separation units through a raw-water supply system; filling the primary sides of the membrane separation units with the raw water by pressing air out of the flushing-air supply system filled with flushing air supplied in the cleaning; and collecting permeate through a permeate collection system, the permeate having passed through the secondary sides from the primary sides of the membrane separation units.

According to the present invention, in the flushing, flushing air is supplied upward into the air main pipe of the flushing-air supply system so as to flow upward in the raw water of the air main pipe. Thus, the flushing air quickly moves in the air main pipe and flows into the air branch pipes, which are connected in parallel to the air main pipe, substantially at the same time with a small difference in arrival time. Hence, the flushing air substantially simultaneously flows into the membrane separation units of the stages through the air branch pipes with a small difference in arrival time, thereby cleaning the membrane separation units, which are vertically disposed in multiple stages, substantially at the same time.

This prevents a large amount of flushing air from being consumed by the membrane separation units of specific one of the stages, enabling air purge with a small amount of flushing air. Air purge is performed while the air container for supplying flushing air has a high air pressure, achieving high-pressure cleaning with excellent detergency.

Moreover, backwash drain water from the membrane separation units of the stages flows into the backwash-drainage main pipe substantially at the same time, providing a uniform drainage resistance in the backwash-drainage branch pipes of the stages. This can evenly supply flushing air into the membrane separation units of the stages.

DETAILED DESCRIPTION OF THE INVENTION

Figure 1:
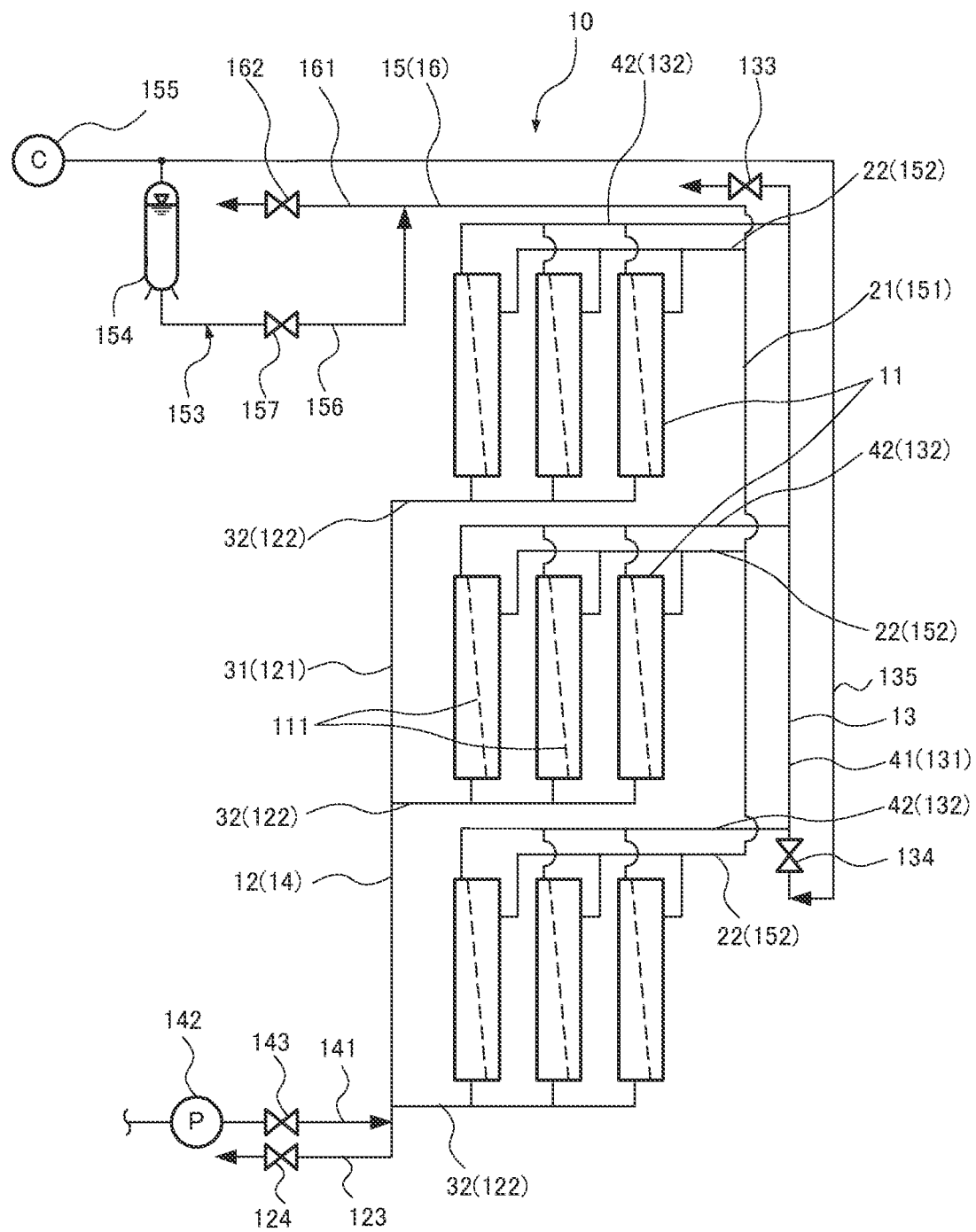
FIG. 1 is a schematic diagram illustrating a membrane filtration device according to an embodiment of the present invention.

An embodiment of the present invention will be described below in accordance with the accompanying drawings. In FIG. 1, a membrane filtration device 10 includes membrane separation units 11 vertically disposed in multiple stages. FIG. 1 illustrates three stages, each including the membrane separation units 11 placed in parallel. Any configuration may be used, provided that at least one membrane separation unit 11 is provided in at least two stages.

The primary sides of the membrane separation units 11 communicate with a backwash drainage system 12 and a flushing-air supply system 13 and receive supplied raw water. The backwash drainage system 12 also acts as a raw-water supply system 14. The secondary sides of the membrane separation units 11 communicate with a backwash-water supply system 15 so as to collect permeate. The backwash-water supply system 15 also acts as a permeate collection system 16.

The backwash-water supply system 15 and the permeate collection system 16 include a vertical pipe 21 and a plurality of horizontal pipes 22 as common pipes.

The vertical pipe 21 in the backwash-water supply system 15 serves as a backwash-water main pipe 151 in which backwash water flows downward from the top of the pipe. The horizontal pipes 22 serve as backwash-water branch pipes 152 that are connected in parallel to the backwash-water main pipe 151 and feed backwash water into the membrane separation units 11 of the stages.

In the permeate collection system 16, permeate having passed through the membrane separation units 11 flows into the vertical pipe 21 through the horizontal pipes 22 and then passes through the vertical pipe 21 upward.

The upper end of the vertical pipe 21 is connected to a backwash-water supply unit 153 of the backwash-water supply system 15 and a permeate outlet 161 of the permeate collection system 16. The backwash-water supply unit 153 includes an accumulator 154, a compressor 155 for supplying compressed air into the accumulator 154, and a backwash water inlet 156 for connecting the bottom of the accumulator 154 and the horizontal pipes 22 while the bottom of the accumulator 154 is in the liquid side.

The permeate outlet 161 has a first valve 162 while the backwash water inlet 156 has a second valve 157.

The backwash drainage system 12 and the raw-water supply system 14 include a vertical pipe 31 and a plurality of horizontal pipes 32 as common pipes. The vertical pipe 31 in the backwash drainage system 12 serves as a backwash-drainage main pipe 121 in which backwash drain water flows downward from the top of the pipe. The horizontal pipes 32 serve as backwash-drainage branch pipes 122 connected in parallel to the backwash-drainage main pipe 121.

In the backwash drainage system 12, backwash drain water flows from the membrane separation units 11 into the vertical pipe 31 through the horizontal pipes 32 and passes through the vertical pipe 31 downward.

In the raw-water supply system 14, raw water passes through the vertical pipe 31 upward. The raw water having flowed into the horizontal pipes 32 from the vertical pipe 31 is supplied into the membrane separation units 11.

The lower end of the vertical pipe 31 is connected to a backwash drain-water outlet 123 of the backwash drainage system 12 and a raw water inlet 141. The raw water inlet 141 includes a raw water pump 142 for supplying raw water and a third valve 143. The backwash drain-water outlet 123 has a fourth valve 124.

The flushing-air supply system 13 includes an air main pipe 131 for a vertical pipe 41 that passes flushing air upward, and air branch pipes 132 for a plurality of horizontal pipes 42 that are connected in parallel to the air main pipe 131 and feed flushing air into the membrane separation units 11 of the stages.

The air main pipe 131 has a fifth valve 133 on the upper end and an air supply pipe 135 connected to the lower end via a sixth valve 134. The upstream end of the air supply pipe 135 is connected to the compressor 155 and the top of the accumulator 154, the top being placed in a gas phase.

In the present embodiment, cleaning drain water is a gas-liquid mixed fluid of flushing air and backwash water. The flushing air is compressed air stored in the accumulator 154. The backwash water is permeate stored in the accumulator 154.

The operations of the configuration will be described below.

(Membrane Filtration Step)

While the second valve 157, the fifth valve 133, and the sixth valve 134 are closed, the raw water pump 142 is driven with the closed fourth valve 124, the opened first valve 162, and the opened third valve 143.

Raw water flows from the raw water inlet 141 into the raw-water supply system 14, passes through the vertical pipe 31 upward, and flows into the primary sides of the membrane separation units 11 through the horizontal pipes 32.

At the start of raw water supply, raw water is passed through the air branch pipes 132 and the air main pipe 131 of the flushing-air supply system 13 with the opened fifth valve 133, and then air in the pipes is evacuated to fill the air branch pipes 132 and the air main pipe 131 with the raw water.

The raw water is filtered through filtration membranes 111 of the membrane separation units 11, and then permeate flows into the permeate collection system 16 from the secondary sides of the membrane separation units 11. The permeate flows into the horizontal pipes 22 from the membrane separation units 11 and is drained out of the system from the permeate outlet 161 through the vertical pipe 41.

(Cleaning Step)

While the first valve 162, the third valve 143, the fifth valve 133, and the sixth valve 134 are closed, the second valve 157 and the fourth valve 124 are opened. The backwash-water supply unit 153 presses backwash water from the accumulator 154 into the backwash-water supply system 15 through the backwash water inlet 156 by using an air pressure of the gas phase portion of the accumulator 154.

The backwash water flows into the backwash-water branch pipes 152 of the stages through the backwash-water main pipe 151 and flows into the membrane separation units 11 of the stages.

The backwash water having flowed into the secondary sides of the membrane separation units 11 flows backward from the secondary sides to the primary sides of the filtration membranes 111, thereby washing foreign matters away from the primary sides of the filtration membranes 111. Backwash drain water flows from the membrane separation units 11 into the backwash-drainage main pipe 121 through the backwash-drainage branch pipes 122 of the stages, passes through the backwash-drainage main pipe 121 downward, and flows out of the system from the backwash drain-water outlet 123.

(Flushing Step)

While the first valve 162, the third valve 143, and the fifth valve 133 are closed and the second valve 157 and the fourth valve 124 are opened, the sixth valve 134 is opened. The backwash-water supply unit 153 presses backwash water from the accumulator 154 into the backwash-water supply system 15 through the backwash water inlet 156 by using an air pressure of the gas phase portion of the accumulator 154. Compressed air in the accumulator 154 is supplied as flushing air into the flushing-air supply system 13 through the air supply pipe 135.

The backwash water flows into the backwash-water branch pipes 152 of the stages through the backwash-water main pipe 151, passes through the membrane separation units 11 of the stages from the backwash-water branch pipes 152, and flows backward from the secondary sides to the primary sides of the filtration membranes 111, thereby washing foreign matters away in the primary sides of the filtration membranes 111.

Flushing air flows into the air branch pipes 132 through the air main pipe 131 and passes through the primary sides of the membrane separation units 11 of the stages from the air branch pipes 132.

The flushing air having flowed into the primary sides of the membrane separation units 11 and the backwash water having passed through the filtration membranes 111 are mixed into a gas-liquid mixed fluid that cleans the primary sides of the membrane separation units 11. Backwash drain water in a gas-liquid mixed phase flows from the membrane separation units 11 into the backwash-drainage main pipe 121 through the backwash-drainage branch pipes 122 of the stages, passes through the backwash-drainage main pipe 121 downward, and flows out of the system from the backwash drain-water outlet 123.

In the flushing step, flushing air is supplied upward into the air main pipe 131 of the flushing-air supply system 13. The air main pipe 131 is filled with raw water supplied in the filtering step.

Flushing air flowing upward in the raw water of the air main pipe 131 quickly moves and flows into the air branch pipes 132, which are connected in parallel to the air main pipe 131, substantially at the same time with a small difference in arrival time.

Thus, flushing air substantially simultaneously flows into the membrane separation units 11 of the stages through the air branch pipes 132 with a small difference in arrival time, thereby cleaning the membrane separation units 11, which are vertically disposed in multiple stages, substantially at the same time.

This prevents a large amount of flushing air from being consumed by the membrane separation units of specific one of the stages, enabling air purge with a small amount of flushing air. Air purge is performed while the accumulator 154 for supplying flushing air has a high air pressure, achieving high-pressure cleaning with excellent detergency.

Moreover, backwash drain water from the membrane separation units 11 of the stages flows into a backwash-drainage main pipe 151 substantially at the same time, providing a uniform drainage resistance in backwash-drainage branch pipes 152 of the stages. This can evenly supply flushing air into the membrane separation units 11 of the stages.

In the present embodiment, backwash water is supplied from the upper end of the backwash-water main pipe 151, and then the backwash water flows into the membrane separation units 11 of the stages while passing through the backwash-water main pipe 151 downward. However, the backwash-water supply system is always filled with treated permeate and causes a large pressure loss when backwash water passes through the filtration membranes 111.

Thus, whether backwash water is supplied from the lower end or an intermediate point of the backwash-water main pipe 151 does not affect a time from the arrival of flushing air at the membrane separation units 11 of the stages to the drainage of the flushing air from cleaning-drain-water branch pipes 122 of the stages.

In other words, backwash water may be supplied from any point of the backwash-water main pipe 151.

Comparative Example 1

Figure 2:
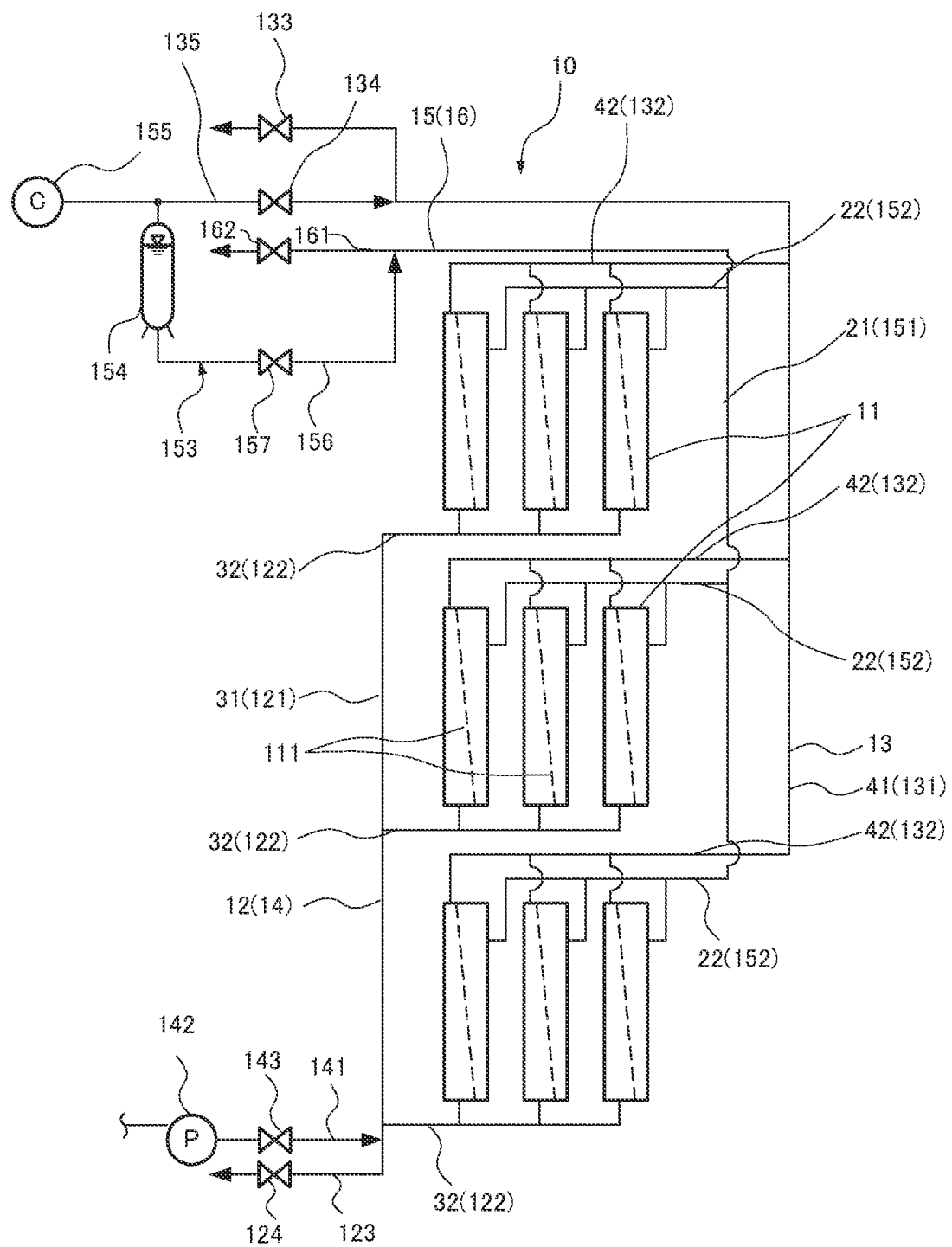
FIG. 2 is a schematic diagram illustrating a membrane filtration device according to comparative example 1 of the present invention.

FIG. 2 illustrates comparative example 1 of the present invention. The same elements as those of the configuration of FIG. 1 are indicated by the same reference numerals, and the explanation thereof is omitted.

FIG. 2 is different from the configuration of FIG. 1 in that the air supply pipe 135 is connected to the upper end of the air main pipe 131.

The filtering step and the cleaning step of FIG. 2 are similar to those of the foregoing embodiment, and thus the explanation thereof is omitted.

In the flushing step, flushing air is supplied downward from the top of the air main pipe 131.

Hence, raw water filling the interior of the air main pipe 131 interferes with a movement of the flushing air. In order to move the flushing air in the air main pipe 131, the raw water filling the air main pipe 131 is required to be pressed downward. Thus, flushing air affected by a resistance of raw water first flows into the air branch pipe 132 of the upper stage, cleaning the membrane separation units 11 of the upper stage with a gas-liquid mixed fluid.

Cleaning drain water of a gas-liquid mixed fluid is drained from the membrane separation units 11 of the upper stage by the air pressure of flushing air and then is preferentially passed through a cleaning-drain-water main pipe 121 from the cleaning-drain-water branch pipe 122 of the upper stage. This interferes with cleaning drain water flowing from the cleaning-drain-water branch pipes 122 of the intermediate and lower stages into the cleaning-drain-water main pipe 121.

This causes a delay in cleaning the membrane separation units 11 of the intermediate and lower stages by flushing and causes the flushing step of the membrane separation units 11 to proceed in the order of the upper stage, the intermediate stage, and the lower stage, requiring a long time before passing flushing air into the air branch pipe 132 of the lower stage. Thus, the flushing air is not substantially simultaneously delivered into the membrane modules 11 of different heights, and a large amount of flushing air is consumed in the flushing step of the membrane separation units 11 of the upper stage.

Furthermore, when flushing air reaches the air branch pipe 132 of the lower stage, an air pressure decreases in the accumulator 154, thereby lessening the effect of cleaning the membrane modules 11 connected to the air branch pipe 132 of the lower stage.

Table 1 indicates the measurement results of a time from the arrival of flushing air at the membrane separation units 11 of the stages to the drainage of the flushing air from cleaning-drain-water branch pipes 122 of the stages in a comparison between the foregoing embodiment of the present invention and comparative example 1.

TABLE 1

|  | Connection position of the air supply pipe 135 | |
| --- | --- | --- |
|  | Connected to the upper end (comparative example 1) | Connected to the lower end (embodiment) |
| Flushing air pressure (kPa) | 120 | 120 |
| Time before arrival at the membrane separation unit of the upper stage (s) | 8.0 | 9.0 |
| Time before arrival at the membrane separation unit of the intermediate stage (s) | 9.0 | 8.4 |
| Time before arrival at the membrane separation unit of the lower stage (s) | 15.6 | 8.4 |

Flushing air supplied from the top to the bottom of the air main pipe 131 varies in arrival time, whereas flushing air supplied from the bottom to the top of the air main pipe 131 flows into the membrane separation units 11 substantially at the same time with a small difference in arrival time and is drained therefrom, thereby cleaning the membrane separation units 11, which are vertically disposed in multiple stages, substantially at the same time.

Comparative Example 2

Figure 3:
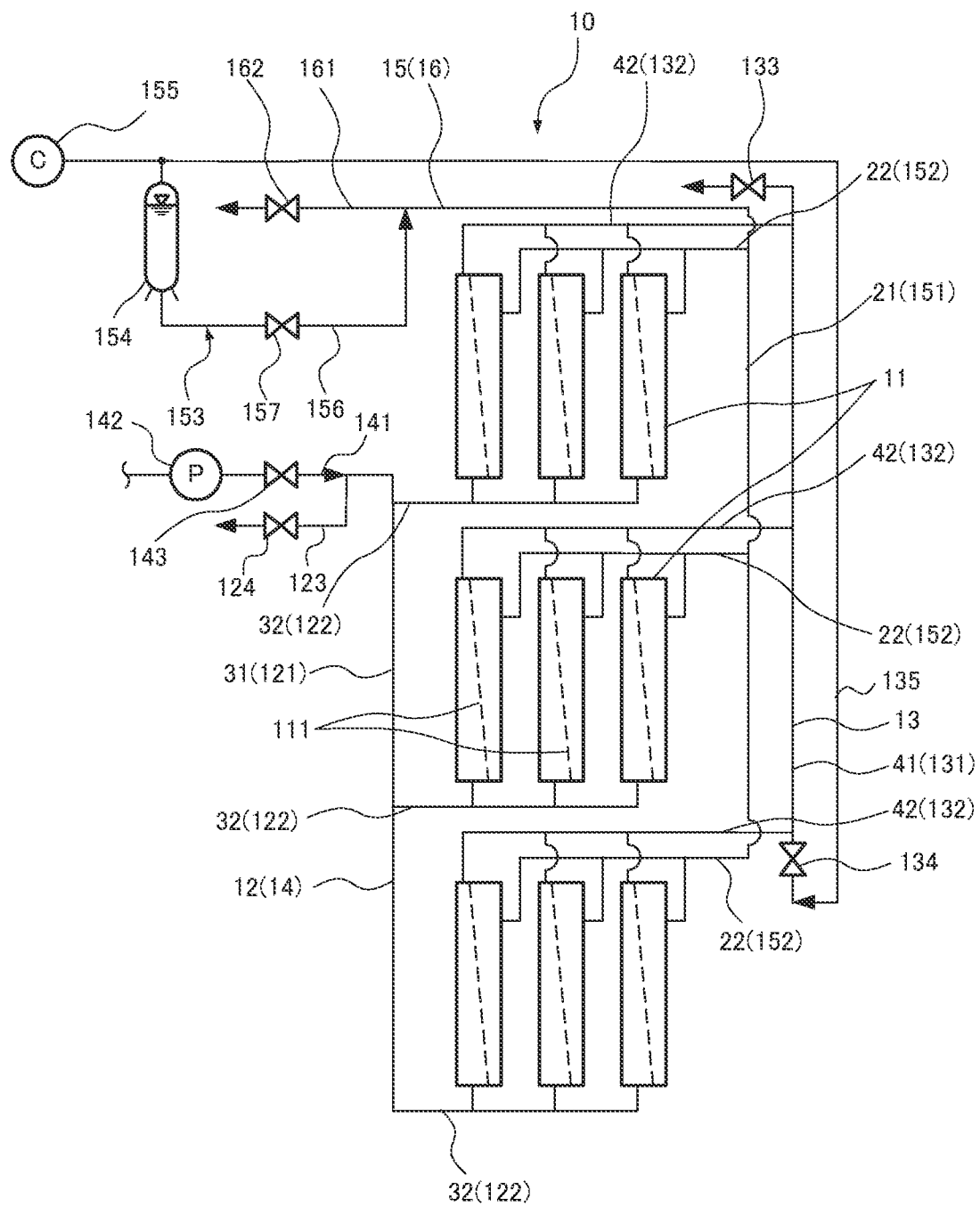
FIG. 3 is a schematic diagram illustrating a membrane filtration device according to comparative example 2 of the present invention.

FIG. 3 illustrates comparative example 2 of the present invention. The same elements as those of the configuration of FIG. 1 are indicated by the same reference numerals, and the explanation thereof is omitted.

FIG. 3 is different from the configuration of FIG. 1 in that the raw water inlet 141 and the backwash drain-water outlet 123 are connected to the upper end of the backwash-drainage main pipe 121.

The filtering step and the cleaning step of FIG. 3 are similar to those of the foregoing embodiment, and thus the explanation thereof is omitted.

In the flushing step, flushing air is supplied upward from the bottom of the air main pipe 131. However, the backwash-drainage main pipe 121 is filled with backwash drain water while the head of backwash drain water of the air main pipe 131 is applied to the backwash-drainage branch pipe 122 of the lower stage. Thus, backwash drain water cannot be pressed out of the membrane separation units 11 of the lower stage by the air pressure of flushing air supplied into the air branch pipe 132 of the lower stage, so that flushing air first flows into the air branch pipe 132 of the upper stage, cleaning the membrane separation units 11 of the upper stage with a gas-liquid mixed fluid.

While a gas-liquid mixed fluid flows into the backwash-drainage main pipe 121 from the backwash-drainage branch pipe 122 of the upper stage, flushing air flows into the air branch pipe 132 of the intermediate stage, cleaning the membrane separation units 11 of the intermediate stage with a gas-liquid mixed fluid.

While a gas-liquid mixed fluid flows into the backwash-drainage main pipe 121 from the backwash-drainage branch pipes 122 of the upper and intermediate stages, flushing air flows into the air branch pipe 132 of the lower stage, cleaning the membrane separation units 11 of the lower stage with a gas-liquid mixed fluid.

This causes a delay in cleaning the membrane separation units 11 of the intermediate and lower stages by flushing and causes the flushing step of the membrane separation units 11 to proceed in the order of the upper stage, the intermediate stage, and the lower stage, requiring a long time before passing flushing air into the air branch pipe 132 of the lower stage. Thus, the flushing air is not substantially simultaneously delivered into the membrane modules 11 of different heights, and a large amount of flushing air is consumed in the flushing step of the membrane separation units 11 of the upper stage.

Furthermore, when flushing air reaches the air branch pipe 132 of the lower stage, an air pressure decreases in the accumulator 154, thereby lessening the effect of cleaning the membrane modules 11 connected to the air branch pipe 132 of the lower stage.

Comparative Example 3

Figure 4:
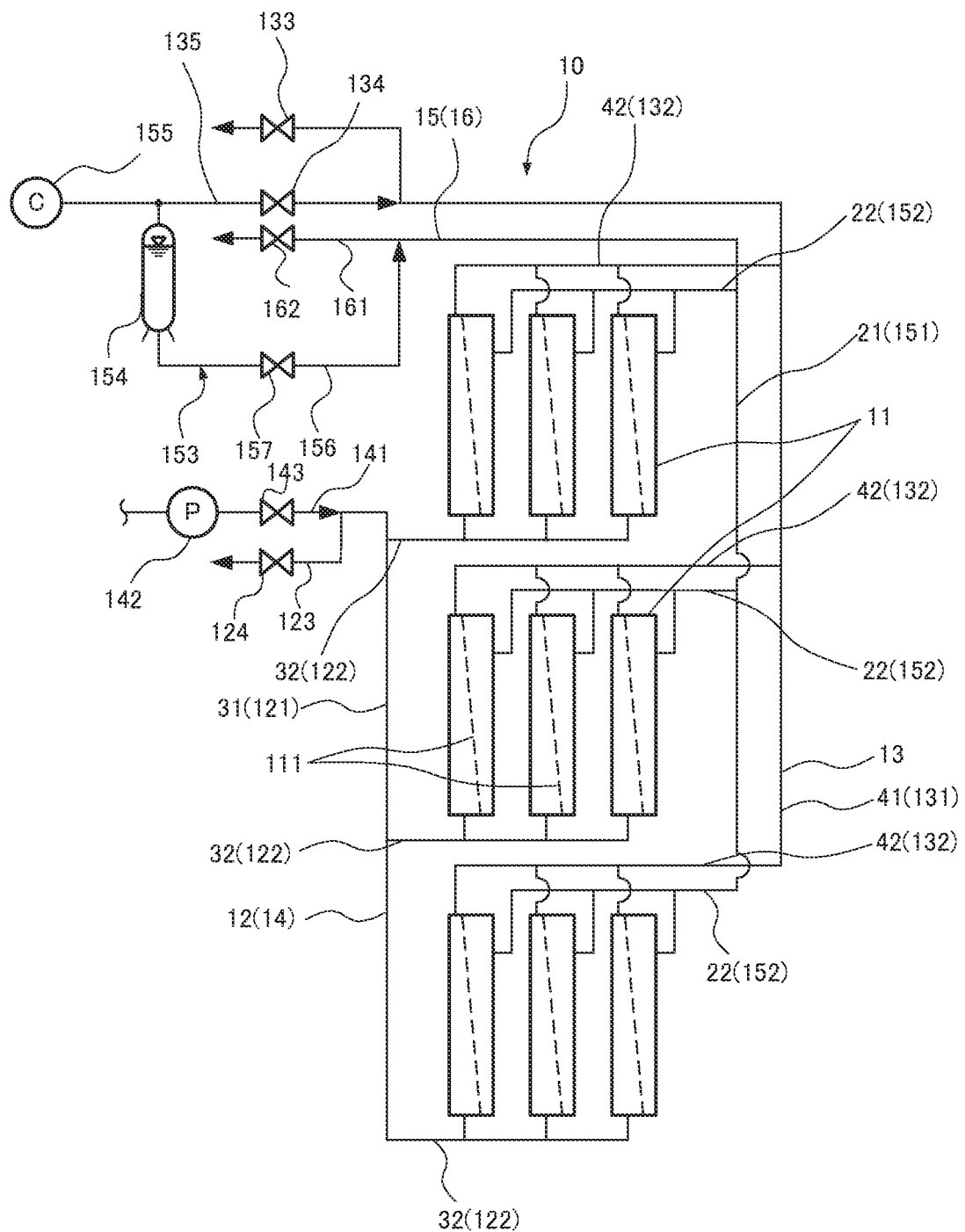
FIG. 4 is a schematic diagram illustrating a membrane filtration device according to comparative example 3 of the present invention.
Figure 5:
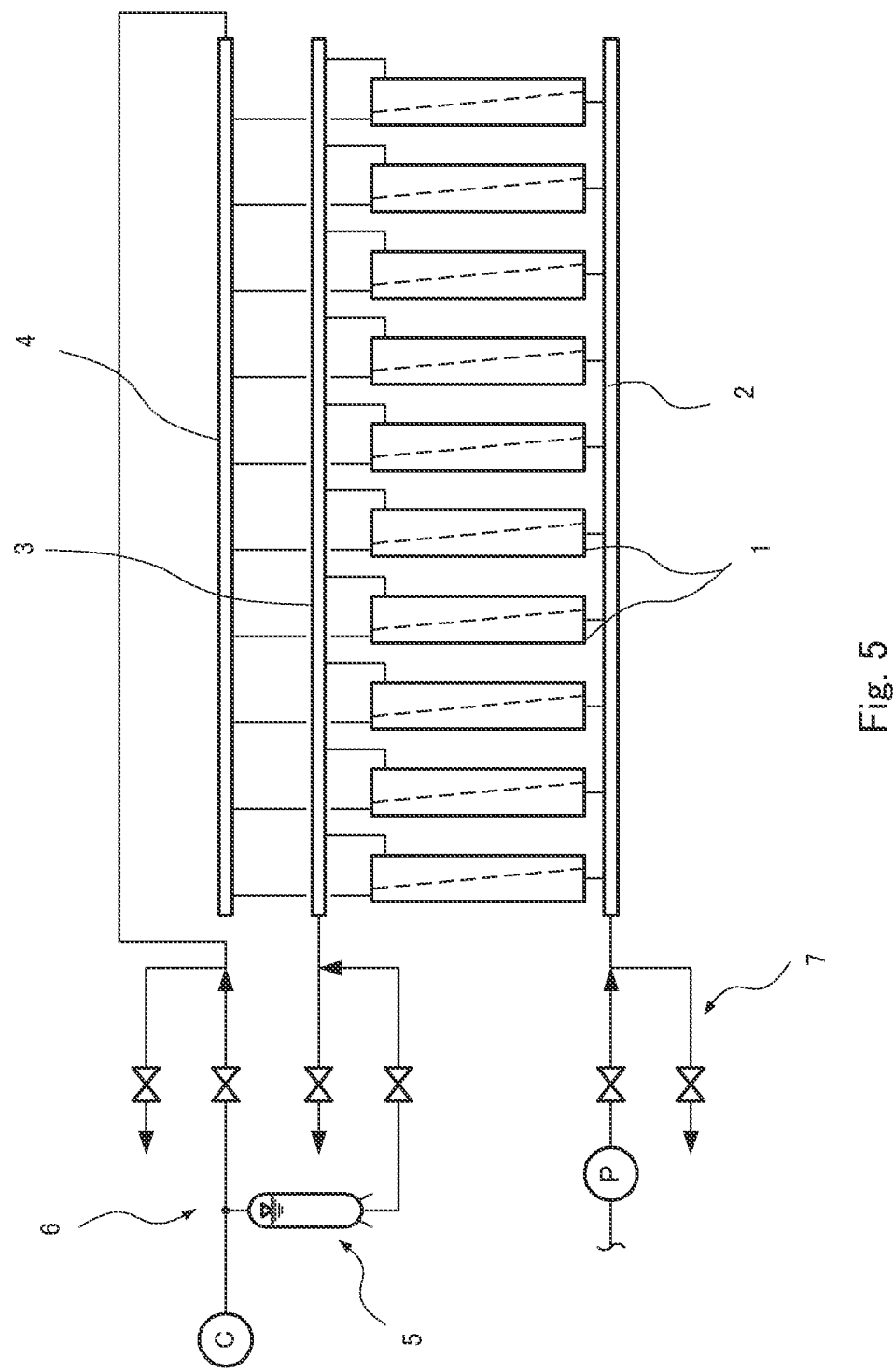
FIG. 5 is a schematic diagram illustrating a membrane filtration device according to the related art.

FIG. 4 illustrates comparative example 3 of the present invention. The same elements as those of the configuration of FIG. 1 are indicated by the same reference numerals, and the explanation thereof is omitted.

FIG. 4 is different from the configuration of FIG. 1 in that the air supply pipe 135 is connected to the upper end of the air main pipe 131 while the raw water inlet 141 and the backwash drain-water outlet 123 are connected to the upper end of the backwash-drainage main pipe 121.

The filtering step and the cleaning step of FIG. 4 are similar to those of the foregoing embodiment, and thus the explanation thereof is omitted.

In the flushing step, flushing air is supplied downward from the top of the air main pipe 131.

Hence, raw water filling the interior of the air main pipe 131 interferes with a movement of the flushing air. In order to move the flushing air in the air main pipe 131, the raw water filling the air main pipe 131 is required to be pressed downward. Furthermore, the backwash-drainage main pipe 121 is filled with backwash drain water while the head of the raw water of the air main pipe 131 is applied to the backwash-drainage branch pipe 122 of the lower stage. Thus, backwash drain water cannot be pressed out of the membrane separation units 11 of the lower stage by the air pressure of flushing air supplied into the air branch pipe 132, so that flushing air first flows into the air branch pipe 132 of the upper stage, cleaning the membrane separation units 11 of the upper stage with a gas-liquid mixed fluid.

While a gas-liquid mixed fluid flows into the backwash-drainage main pipe 121 from the backwash-drainage branch pipe 122 of the upper stage, flushing air flows into the air branch pipe 132 of the intermediate stage, cleaning the membrane separation units 11 of the intermediate stage with a gas-liquid mixed fluid.

While a gas-liquid mixed fluid flows into the backwash-drainage main pipe 121 from the backwash-drainage branch pipes 122 of the upper and intermediate stages, flushing air flows into the air branch pipe 132 of the lower stage, cleaning the membrane separation units 11 of the lower stage with a gas-liquid mixed fluid.

This causes a delay in cleaning the membrane separation units 11 of the intermediate and lower stages by flushing and causes the flushing step of the membrane separation units 11 to proceed in the order of the upper stage, the intermediate stage, and the lower stage, requiring a long time before passing flushing air into the air branch pipe 132 of the lower stage. Thus, the flushing air is not substantially simultaneously delivered into the membrane modules 11 of different heights, and a large amount of flushing air is consumed in the flushing step of the membrane separation units 11 of the upper stage.

Furthermore, when flushing air reaches the air branch pipe 132 of the lower stage, an air pressure decreases in the accumulator 154, thereby lessening the effect of cleaning the membrane modules 11 connected to the air branch pipe 132 of the lower stage.

What is claimed is:

1. A method for cleaning a membrane filtration device including multiple membrane separation units, with each unit being vertically on top of one another, and each unit being a stage, wherein each of the membrane separation units has a primary side communicating with a backwash drainage system and a flushing-air supply system so as to receive supplied raw water and a secondary side communicating with a backwash-water supply system so as to collect permeate, the membrane separation unit performing membrane filtration and cleaning, wherein the cleaning includes:

supplying flushing air into the primary sides of the membrane separation units through the flushing-air supply system while supplying backwash water into the secondary sides of the membrane separation units through the backwash-water supply system; and draining backwash drain water of a gas-liquid mixed fluid from the primary sides of the membrane separation units through the backwash drainage system, wherein the backwash water is supplied downward into a backwash-water main pipe of the backwash-water supply system and is fed into the membrane separation units of the stages through backwash-water branch pipes connected in parallel to the backwash-water main pipe, wherein the flushing air is supplied upward into an air main pipe of the flushing-air supply system filled with raw water supplied in the membrane filtration, wherein the flushing air flows upward in the raw water of the air main pipe into a plurality of air branch pipes connected in parallel to the air main pipe and is fed into the membrane separation units of the stages through the air branch pipes substantially simultaneously, and wherein the backwash drain water is drained from the membrane separation units of the stages into backwash-drainage branch pipes of the stages and flows downward from the membrane separation units of the stages substantially at the same time in a backwash-drainage main pipe connected in parallel to the backwash-drainage branch pipes of the stages.

2. The method for cleaning a membrane filtration device according to claim 1, wherein the flushing air contains compressed air stored in an air container of an air supply unit connected to a lower end of the air main pipe, and the compressed air is supplied into the flushing-air supply system by an air pressure in the air container.

3. The method for cleaning a membrane filtration device according to claim 2, wherein the membrane filtration includes:

supplying raw water into the primary sides of the membrane separation units through a raw-water supply system;

filling the primary sides of the membrane separation units with the raw water by pressing air out of the flushing-air supply system filled with flushing air supplied in the cleaning; and collecting permeate through a permeate collection system, the permeate having passed through the secondary sides from the primary sides of the membrane separation units.

\* \* \* \* \*